US007578740B2

(12) United States Patent
Marks et al.

(10) Patent No.: US 7,578,740 B2
(45) Date of Patent: Aug. 25, 2009

(54) GAMING DEVICE AND METHOD HAVING PAYLINE PROGRESSIVE AWARDS

(75) Inventors: Daniel M. Marks, Washington, DC (US); Anthony M. Singer, Ringwood, NJ (US); Howard M. Marks, Scarsdale, NY (US)

(73) Assignee: IGT, Reno, NV (US)

( * ) Notice: Subject to any disclaimer, the term of this patent is extended or adjusted under 35 U.S.C. 154(b) by 557 days.

(21) Appl. No.: 11/325,873

(22) Filed: Jan. 5, 2006

(65) Prior Publication Data

US 2006/0183535 A1 Aug. 17, 2006

Related U.S. Application Data

(60) Provisional application No. 60/641,640, filed on Jan. 5, 2005.

(51) Int. Cl.
*A63F 9/24* (2006.01)
*A63F 13/00* (2006.01)
*G06F 17/00* (2006.01)
*G06F 19/00* (2006.01)

(52) U.S. Cl. .............................. 463/27; 463/16; 463/42; 463/43

(58) Field of Classification Search ................... 463/16, 463/27, 42–43

See application file for complete search history.

(56) References Cited

U.S. PATENT DOCUMENTS

| | | | |
|---|---|---|---|
| 4,198,052 | A | 4/1980 | Gauselmann |
| 4,448,419 | A | 5/1984 | Telnaes |
| 4,618,150 | A | 10/1986 | Kimura |
| 4,624,459 | A | 11/1986 | Kaufman |
| 4,695,053 | A | 9/1987 | Vazquez, Jr. et al. |
| 4,732,386 | A | 3/1988 | Rayfiel |
| 4,756,531 | A | 7/1988 | DiRe et al. |
| 4,775,155 | A | 10/1988 | Lees |
| 4,838,552 | A | 6/1989 | Hagiwara |
| 4,991,848 | A | 2/1991 | Greenwood et al. |
| 5,085,436 | A | 2/1992 | Bennett |
| 5,116,055 | A | 5/1992 | Tracy |
| RE34,244 | E | 5/1993 | Hagiwara |
| 5,209,479 | A | 5/1993 | Nagao et al. |
| 5,275,400 | A | 1/1994 | Weingardt et al. |
| 5,280,909 | A | 1/1994 | Tracy |
| 5,342,047 | A | 8/1994 | Heidel et al. |

(Continued)

FOREIGN PATENT DOCUMENTS

AU 199716432 B2 9/1997

(Continued)

OTHER PUBLICATIONS

A Quantum Leap for Video Poker game descriptions, written by IGT, published in 2001.

(Continued)

*Primary Examiner*—Dmitry Suhol
*Assistant Examiner*—Jason Pinheiro
(74) *Attorney, Agent, or Firm*—K&L Gates LLP

(57) ABSTRACT

A gaming device which includes a variety of methods to provide distinct progressive awards for two or more paylines. In one embodiment, each and every payline has its own progressive award that issues upon the appearance of a predetermined symbol combination on that payline.

34 Claims, 6 Drawing Sheets

U.S. PATENT DOCUMENTS

| | | | |
|---|---|---|---|
| 5,344,144 | A | 9/1994 | Canon |
| 5,393,057 | A | 2/1995 | Marnell, II |
| 5,393,061 | A | 2/1995 | Manship et al. |
| 5,395,111 | A | 3/1995 | Inoue |
| 5,449,173 | A | 9/1995 | Thomas et al. |
| 5,476,259 | A | 12/1995 | Weingardt |
| 5,489,101 | A | 2/1996 | Moody |
| 5,531,448 | A | 7/1996 | Moody |
| 5,536,016 | A | 7/1996 | Thompson |
| 5,580,053 | A | 12/1996 | Crouch |
| 5,580,055 | A | 12/1996 | Hagiwara |
| 5,584,764 | A | 12/1996 | Inoue |
| 5,611,535 | A | 3/1997 | Tiberio |
| 5,611,730 | A | 3/1997 | Weiss |
| 5,645,486 | A | 7/1997 | Nagao et al. |
| 5,720,483 | A | 2/1998 | Trinh |
| 5,722,891 | A | 3/1998 | Inoue |
| 5,732,950 | A | 3/1998 | Moody |
| 5,752,881 | A | 5/1998 | Inoue |
| 5,769,716 | A | 6/1998 | Saffari et al. |
| 5,772,509 | A | 6/1998 | Weiss |
| 5,788,573 | A | 8/1998 | Baerlocher et al. |
| 5,807,172 | A | 9/1998 | Piechowiak |
| 5,816,916 | A | 10/1998 | Moody |
| 5,823,873 | A | 10/1998 | Moody |
| 5,823,874 | A | 10/1998 | Adams |
| 5,833,536 | A | 11/1998 | Davids et al. |
| 5,833,537 | A | 11/1998 | Barrie |
| 5,848,932 | A | 12/1998 | Adams |
| 5,851,148 | A | 12/1998 | Brune et al. |
| 5,855,515 | A | 1/1999 | Pease et al. |
| 5,882,261 | A | 3/1999 | Adams |
| 5,890,962 | A | 4/1999 | Takemoto |
| 5,902,184 | A | 5/1999 | Bennett et al. |
| 5,919,088 | A | 7/1999 | Weiss |
| 5,927,714 | A | 7/1999 | Kaplan |
| 5,947,820 | A | 9/1999 | Morro et al. |
| 5,951,397 | A | 9/1999 | Dickinson |
| 5,954,335 | A | 9/1999 | Moody |
| 5,980,384 | A | 11/1999 | Barrie |
| 5,984,781 | A | 11/1999 | Sunaga |
| 5,984,782 | A | 11/1999 | Inoue |
| 5,997,400 | A | 12/1999 | Seelig et al. |
| 5,997,401 | A | 12/1999 | Crawford |
| 6,004,207 | A | 12/1999 | Wilson, Jr. et al. |
| 6,007,066 | A | 12/1999 | Moody |
| 6,012,982 | A | 1/2000 | Piechowiak et al. |
| 6,015,346 | A | 1/2000 | Bennett |
| 6,027,115 | A | 2/2000 | Griswold et al. |
| 6,033,307 | A | 3/2000 | Vancura |
| 6,056,642 | A | 5/2000 | Bennett |
| 6,059,289 | A | 5/2000 | Vancura |
| 6,062,980 | A | 5/2000 | Luciano |
| 6,062,981 | A | 5/2000 | Luciano, Jr. |
| 6,089,928 | A | 7/2000 | Miwa et al. |
| 6,089,976 | A | 7/2000 | Schneider et al. |
| 6,089,977 | A | 7/2000 | Bennett |
| 6,093,102 | A | 7/2000 | Bennett |
| 6,095,921 | A | 8/2000 | Walker et al. |
| 6,098,985 | A | 8/2000 | Moody |
| 6,102,798 | A | 8/2000 | Bennett |
| 6,110,043 | A | 8/2000 | Olsen |
| 6,113,098 | A | 9/2000 | Adams |
| 6,120,377 | A | 9/2000 | McGinnis, Sr. et al. |
| 6,120,378 | A | 9/2000 | Moody et al. |
| 6,126,542 | A | 10/2000 | Fier |
| 6,146,273 | A | 11/2000 | Olsen |
| 6,155,925 | A | 12/2000 | Giobbi et al. |
| 6,159,095 | A | 12/2000 | Frohm et al. |
| 6,159,097 | A | 12/2000 | Gura |
| 6,159,098 | A | 12/2000 | Slomiany et al. |
| 6,162,121 | A | 12/2000 | Morro et al. |
| 6,165,070 | A | 12/2000 | Nolte et al. |
| 6,168,520 | B1 | 1/2001 | Baerlocher et al. |
| 6,174,233 | B1 | 1/2001 | Sunaga et al. |
| 6,186,894 | B1 | 2/2001 | Mayeroff |
| 6,190,254 | B1 | 2/2001 | Bennett |
| 6,190,255 | B1 | 2/2001 | Thomas et al. |
| 6,200,217 | B1 | 3/2001 | Osawa |
| 6,203,010 | B1 | 3/2001 | Jorasch et al. |
| 6,203,430 | B1 | 3/2001 | Walker et al. |
| 6,220,959 | B1 | 4/2001 | Holmes, Jr. et al. |
| 6,224,482 | B1 | 5/2001 | Bennett |
| 6,224,483 | B1 | 5/2001 | Mayeroff |
| 6,224,484 | B1 | 5/2001 | Okuda et al. |
| 6,227,971 | B1 | 5/2001 | Weiss |
| 6,231,442 | B1 | 5/2001 | Mayeroff |
| 6,234,897 | B1 | 5/2001 | Frohm et al. |
| 6,241,607 | B1 | 6/2001 | Payne et al. |
| 6,251,013 | B1 | 6/2001 | Bennett |
| 6,261,177 | B1 | 7/2001 | Bennett |
| 6,261,178 | B1 | 7/2001 | Bennett |
| 6,270,411 | B1 | 8/2001 | Gura et al. |
| 6,299,165 | B1 | 10/2001 | Nagano |
| 6,309,298 | B1 | 10/2001 | Gerow |
| 6,309,299 | B1 | 10/2001 | Weiss |
| 6,309,300 | B1 | 10/2001 | Glavich |
| 6,311,976 | B1 | 11/2001 | Yoseloff et al. |
| 6,312,334 | B1 | 11/2001 | Yoseloff |
| 6,315,660 | B1 | 11/2001 | DeMar et al. |
| 6,315,664 | B1 | 11/2001 | Baerlocher et al. |
| 6,319,124 | B1 | 11/2001 | Baerlocher et al. |
| 6,328,649 | B1 | 12/2001 | Randall et al. |
| 6,334,814 | B1 | 1/2002 | Adams |
| 6,336,860 | B1 | 1/2002 | Webb |
| 6,346,043 | B1 | 2/2002 | Colin et al. |
| 6,347,996 | B1 | 2/2002 | Gilmore et al. |
| 6,364,314 | B1 | 4/2002 | Canterbury |
| 6,364,766 | B1 | 4/2002 | Anderson et al. |
| 6,386,977 | B1 | 5/2002 | Hole |
| 6,398,218 | B1 | 6/2002 | Vancura |
| 6,413,162 | B1 | 7/2002 | Baerlocher et al. |
| 6,419,579 | B1 | 7/2002 | Bennett |
| 6,419,583 | B1 | 7/2002 | Crumby et al. |
| 6,428,412 | B1 | 8/2002 | Anderson et al. |
| 6,439,993 | B1 | 8/2002 | O'Halloran |
| 6,454,651 | B1 | 9/2002 | Yoseloff |
| 6,461,241 | B1 | 10/2002 | Webb et al. |
| 6,464,581 | B1 | 10/2002 | Yoseloff et al. |
| 6,471,208 | B2 | 10/2002 | Yoseloff et al. |
| 6,471,591 | B1 | 10/2002 | Crumby |
| 6,481,713 | B2 | 11/2002 | Perrie et al. |
| 6,491,584 | B2 | 12/2002 | Graham et al. |
| 6,494,454 | B2 | 12/2002 | Adams |
| 6,517,432 | B1 | 2/2003 | Jaffe |
| 6,533,279 | B2 | 3/2003 | Moody et al. |
| 6,537,150 | B1 | 3/2003 | Luciano et al. |
| 6,547,242 | B1 | 4/2003 | Sugiyama et al. |
| 6,551,187 | B1 | 4/2003 | Jaffe |
| 6,558,253 | B1 | 5/2003 | DeSimone et al. |
| 6,558,254 | B2 | 5/2003 | Baerlocher et al. |
| 6,561,900 | B1 | 5/2003 | Baerlocher et al. |
| 6,602,137 | B2 | 8/2003 | Kaminkow et al. |
| 6,604,999 | B2 | 8/2003 | Ainsworth |
| 6,605,002 | B2 | 8/2003 | Baerlocher |
| 6,609,971 | B2 | 8/2003 | Vancura |
| 6,609,973 | B1 | 8/2003 | Weiss |
| 6,612,927 | B1 | 9/2003 | Slomiany et al. |
| 6,616,142 | B2 | 9/2003 | Adams |
| 6,638,164 | B2 | 10/2003 | Randall et al. |
| 6,695,696 | B1 | 2/2004 | Kaminkow |
| 6,729,621 | B2 | 5/2004 | Moody |
| 6,802,773 | B2 | 10/2004 | Moody |
| 6,817,944 | B2 | 11/2004 | Kaminkow et al. |

| | | | | | |
|---|---|---|---|---|---|
| 6,958,013 | B2 | 10/2005 | Miereau et al. | | |
| 2001/0054794 | A1 | 12/2001 | Cole et al. | | |
| 2002/0025844 | A1 | 2/2002 | Casey et al. | | |
| 2002/0094857 | A1 | 7/2002 | Meyer | | |
| 2003/0045345 | A1 | 3/2003 | Berman | | |
| 2003/0054875 | A1 | 3/2003 | Marks et al. | | |
| 2003/0181231 | A1 | 9/2003 | Vancura et al. | | |
| 2003/0211884 | A1 | 11/2003 | Gauselmann | | |
| 2003/0236116 | A1 | 12/2003 | Marks et al. | | |
| 2004/0009803 | A1 | 1/2004 | Bennett et al. | | |
| 2004/0023714 | A1 | 2/2004 | Asdale | | |
| 2004/0082374 | A1 | 4/2004 | Maya et al. | | |
| 2004/0195773 | A1 | 10/2004 | Masci et al. | | |
| 2004/0242314 | A1 | 12/2004 | Casey | | |
| 2005/0064929 | A1 | 3/2005 | Kaminkow et al. | | |
| 2005/0101372 | A1 | 5/2005 | Mierau et al. | | |
| 2005/0101373 | A1 | 5/2005 | Mierau et al. | | |
| 2005/0119047 | A1 | 6/2005 | Olive | | |
| 2005/0143168 | A1 | 6/2005 | Torango | | |
| 2005/0176488 | A1 | 8/2005 | Olive | | |
| 2005/0209004 | A1 | 9/2005 | Torango | | |
| 2005/0239542 | A1 * | 10/2005 | Olsen | .......................... | 463/27 |

FOREIGN PATENT DOCUMENTS

| | | | |
|---|---|---|---|
| AU | 199717601 | B2 | 9/1997 |
| AU | 199650327 | B2 | 10/1997 |
| AU | 199863553 | | 10/1998 |
| DE | 3700861 | A1 | 7/1988 |
| DE | 4014477 | A1 | 7/1991 |
| EP | 0 060 019 | A1 | 9/1982 |
| EP | 0 238 289 | A3 | 9/1987 |
| EP | 0 410 789 | B1 | 7/1990 |
| EP | 0 688 002 | A1 | 12/1995 |
| EP | 0 798 676 | A1 | 10/1997 |
| EP | 0 874 337 | A1 | 10/1998 |
| EP | 0 926 645 | A2 | 6/1999 |
| EP | 0 944 030 | A2 | 9/1999 |
| EP | 0 945 837 | A2 | 9/1999 |
| EP | 0 984 408 | A2 | 3/2000 |
| EP | 0 984 409 | A2 | 3/2000 |
| EP | 1 298 606 | A2 | 4/2003 |
| EP | 1 184 822 | A2 | 6/2003 |
| GB | 2 083 936 | A | 3/1982 |
| GB | 2 144 644 | A | 3/1982 |
| GB | 2 092 797 | A | 8/1982 |
| GB | 2 137 392 | A | 10/1984 |
| GB | 2 170 636 | A | 2/1986 |
| GB | 2 226 907 | A | 7/1990 |
| GB | 2 328 311 | A | 2/1999 |
| WO | WO 97/32285 | | 9/1997 |
| WO | WO 00/12186 | | 3/2000 |
| WO | WO 00/66235 | | 11/2000 |
| WO | WO 00/76606 | A1 | 12/2000 |
| WO | WO 01/19476 | | 3/2001 |
| WO | WO 01/087441 | | 11/2001 |
| WO | WO 03/049055 | A2 | 3/2003 |
| WO | WO 03/026758 | | 4/2003 |
| WO | WO 2005/083599 | A1 | 9/2005 |
| WO | WO 2005/099425 | A2 | 10/2005 |

OTHER PUBLICATIONS

Addams Family—Cousin It's Hair Day Article, written by Strictly Slots, published Mar. 2004.

Believe it or Not Article, written by Strictly Slots, published in 2001.

Black Swan Advertisement, written by IGT, published prior to 2001.

Bonus Spin Diamond Fives Advertisement, written by IGT, published in 1999.

Bonus Spin Red, White and Blue Advertisement, written by IGT, published in 2000.

Boom Advertisement, written by WMS Gaming, Inc., published in 1998.

Cash Express Advertisement, written by Aristocrat, published in 2002.

Crazy Fruits Article, written by Strictly Slots, published in 2001.

Double Spin Five Times Pay Advertisement, written by IGT, published prior to 2000.

Enchanted Unicorn—Unicorn Bonus Advertisement, written by IGT, published in 2001.

Full House Advertisement, written by Anchor Games, published in 2000.

Gold Fever Advertisement, written Casino Data System, published in 1997.

Jackpot Carnival Hyperlink Advertisement, written by Aristocrat, published prior to 2002.

Jewel in the Crown Advertisement, written by Barcrest, published in 2000.

Penguin Pays Advertisement, written by Aristocrat, published in 1998.

Reel MAGIC™ Gaming Machine Description, written by IGT, available in 1986.

Slot Line Mega Jackpots™ Advertisement, written by IGT, published in 1997.

Slot Line Progressive Advertisement, written by IGT, published in 1993.

Slot Line Progressive Advertisement, written by IGT, published in 1994.

Slot Line Progressive Advertisement, written by IGT, published in 1995.

Slot Line Progressive Mega Jackpots Advertisement, written by IGT, published in 1997.

Slot Line Temperature Rising Game Description, written by IGT, published in 1998.

Slot Machines Article, written by Marshall Fey, published in 1983.

Sphinx II—e-motion Article, written by Strictly Slots, published in Mar. 2004.

Stooges II Article, written by Strictly Slots, published in Jun. 2001.

Super 8 Race Advertisement, written by IGT, published prior to 2001.

Super Cherry Advertisement, written by IGT, published in 2001.

Totem Pole Advertisement, written by IGT, published in 1997.

Vision Series Build a Bonus Advertisement, written by IGT, published in 1999.

Vision Series Double Diamond Advertisement, written by IGT, published prior to 2001.

Vision Series Good Times Advertisement, written by IGT, published in 1999.

Wild Streak Article, written Strictly Slots, published in Mar. 2001.

Winning Streak Web Site Description, written by WMS Gaming Inc. (website), printed on Mar. 21, 2001.

X Factor Brochure, written by WMS Gaming, Inc., published in 1998.

* cited by examiner

GAMING DEVICE AND METHOD HAVING PAYLINE PROGRESSIVE AWARDS

PRIORITY CLAIM

This application is a non-provisional patent application that claims priority to and the benefit of U.S. Provisional Patent Application Ser. No. 60/641,640, filed on Jan. 5, 2005, the entire contents of which is incorporated herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

FIELD

In general, the present invention relates to payline awards for slot machine games. More particularly, the present invention provides distinct progressive awards for two or more paylines.

BACKGROUND

Gaming device manufacturers strive to make wagering gaming devices that provide as much enjoyment, entertainment and excitement as possible for players. Providing interesting and exciting primary or base games and secondary or bonus games in which a player has an opportunity to win potentially large awards or credits is one way to enhance player enjoyment and excitement. Certain known gaming devices use devices such as reels or wheels to enhance the attraction of the gaming machines to players and also to enhance the player's game playing experience.

In one slot gaming device, the gaming device includes a plurality of reels and one or more paylines. Such gaming devices include any suitable number of reels, such as three to five reels, which each display any suitable number of symbols per reel, such as three symbols per reel. In these gaming devices, the player initiates the spinning of the reels by making one or more wagers on one or more paylines. Such gaming devices may have one, three, five, nine, fifteen, twenty-five or any other suitable number of paylines which are horizontal, vertical, diagonal or any combination thereof. The player wagers on a player selected number or combination of paylines, such as one, two, three, five, ten or fifteen paylines and the reels are activated to spin.

After the reels spin to generate a plurality of symbols, the gaming device analyzes the generated symbols to determine if the gaming device has randomly generated a winning symbol or winning symbol combination on one or more of the wagered on paylines. A conventional line pay award is calculated by multiplying the award value for the winning symbol combination by the amount wagered upon the payline upon which the winning symbol combination appears. Such calculated awards are provided to the player.

Progressive awards associated with gaming machines are also known. A progressive award is an award amount which includes an initial amount funded by a casino and an additional amount funded through a portion of each wager made on the progressive gaming machine. For example, 0.1% of each wager placed on the primary game of the gaming machine may be allocated to the progressive award or progressive award fund. The progressive award grows in value as more players play the gaming machine and more portions of the players' wagers are allocated to the progressive award. When a player obtains a winning symbol or symbol combination which results in the progressive award, the accumulated progressive award is provided to the player. After the progressive award is provided to the player, the amount of the next progressive award is reset to the initial value and a portion of each subsequent wager is allocated to the next progressive award.

A progressive award may be associated with a single gaming machine or multiple gaming machines which each contribute portions of the progressive award. The multiple gaming machines may be in the same bank of machines, in the same casino or gaming establishment (usually through a local area network ("LAN")) or in two or more different casinos or gaming establishments (usually through a wide area network ("WAN")). Such progressive awards are sometimes called local area progressives ("LAP") and wide area progressives ("WAP"), respectively.

In one known gaming device with a plurality of paylines, a player can wager on one, more or all of the paylines. One of the paylines is a designated payline associated with a progressive award. In this gaming device, a player must place the maximum wager on each of the paylines to qualify to potentially win the progressive award associated with the designated payline. If the player places the maximum wager on each of the paylines and a symbol combination associated with the progressive award is generated on the designated payline, the player is provided the progressive award. For example, in a nine payline gaming device wherein the ninth payline is the designated payline, the player must place the maximum wager on paylines one to nine to qualify to win the progressive award if the symbol combination associated with the progressive award is generated on the ninth payline. It should be appreciated that if the player places the maximum wager on each of the paylines and a symbol combination associated with the progressive award is generated on one of the non-designated paylines, the player is not provided the progressive award. For example, if the player places the maximum wager on each of paylines one to nine and a symbol combination associated with the progressive award is generated on the third payline, the player is not provided the progressive award. It should be further appreciated that if the player does not place the maximum wager on each of the paylines, then even if a symbol combination associated with the progressive award is generated on the designated payline, the player is not provided the progressive award. For example, even if a symbol combination associated with the progressive award is generated on the ninth payline, if the player does not place the maximum wager on each of paylines one to nine, the player is not provided the progressive award. Accordingly, there is no known gaming device that offers progressive awards on a plurality of paylines and provides the player the opportunity to win any or all of these progressive awards.

New methods of playing slot machines, therefore, are required to provide players, casinos, and manufacturers with unique slot machine games, such as a slot machine game with distinct progressive awards for two or more paylines.

SUMMARY

The present invention includes a variety of methods to provide distinct progressive awards for two or more paylines. In one embodiment, each and every payline has its own distinct progressive award that is provided upon the generation of a predetermined or designated symbol or symbol combination on that payline.

In one embodiment, the gaming device includes a plurality of individual or distinct payline progressive awards. In another embodiment, one, more or each of the distinct payline progressive awards are independent payline progressive awards. In these embodiments, each payline progressive award is associated with an individual payline. That is, the gaming device maintains a plurality of individual payline progressive awards wherein a plurality of or each payline progressive award is individually associated with at least one individual payline. In this embodiment, for a player to win a payline progressive award associated with a specific payline, the player must wager on that specific payline and the gaming device must generate a designated symbol combination (which is associated with a progressive award triggering event) on that specific payline. Accordingly, the same winning symbol or winning symbol combination may result in different awards (and more specifically, different valued progressive awards) based on which payline the winning symbol or winning symbol combination is generated on.

In operation, the gaming device enables the player to select one or more of the paylines and place a wager amount on each of the selected paylines. After placing one or more wagers on one or more paylines, the gaming device allocates a percentage of each wager placed on an individual payline to the progressive award associated with that individual payline.

After wagering upon the paylines, the gaming device randomly generates a plurality of symbols on the reels. The gaming device determines if any winning symbol or winning symbol combination is generated on a wagered on payline. If any winning symbol or winning symbol combination is generated on a wagered on payline, the gaming device determines a payline award based on the generated winning symbol or winning symbol combination and the amount wagered on the payline which the winning symbol or winning symbol combination was generated on. The gaming device provides this determined payline award to the player.

Moreover, the gaming device determines if any designated winning symbols or designated winning symbol combinations which are associated with progressive award triggering events are generated on any wagered on paylines. If the gaming device determines that a designated winning symbol or designated winning symbol combination (which is associated with a progressive award triggering event) is generated on a specific, wagered on payline, the gaming device provides the player the payline progressive award associated with that specific wagered on payline. In this embodiment, the award provided for a designated winning symbol or designated winning symbol combination is dependent on which payline the designated winning symbol or designated winning symbol combination was generated on and the current amount of the payline progressive award associated with that payline. For example, if a designated winning symbol combination (which is associated with a progressive award triggering event) is generated on a first payline associated with a first progressive award, the gaming device provides the player the first progressive award. On the other hand, if the same designated winning symbol combination is generated on a second payline associated with a second, different progressive award, the gaming device provides the player the second, different progressive award. It should be appreciated that in this embodiment, the player may win a plurality of distinct progressive awards based on a plurality of symbol combinations generated on the reels.

Other objects, features and advantages will be apparent from the following detailed disclosure, taken in conjunction with the accompanying sheets of drawings, wherein like numerals refer to like parts, elements, components, steps and processes.

BRIEF DESCRIPTION OF THE DRAWINGS

FIGS. 3A and 3B are front elevation views of one of the display devices of the gaming device disclosed herein, illustrating a plurality of symbols generated on the reels and a payline progressive award provided to a player based on which payline a winning symbol combination was generated on.

DETAILED DESCRIPTION

Figure 1A:
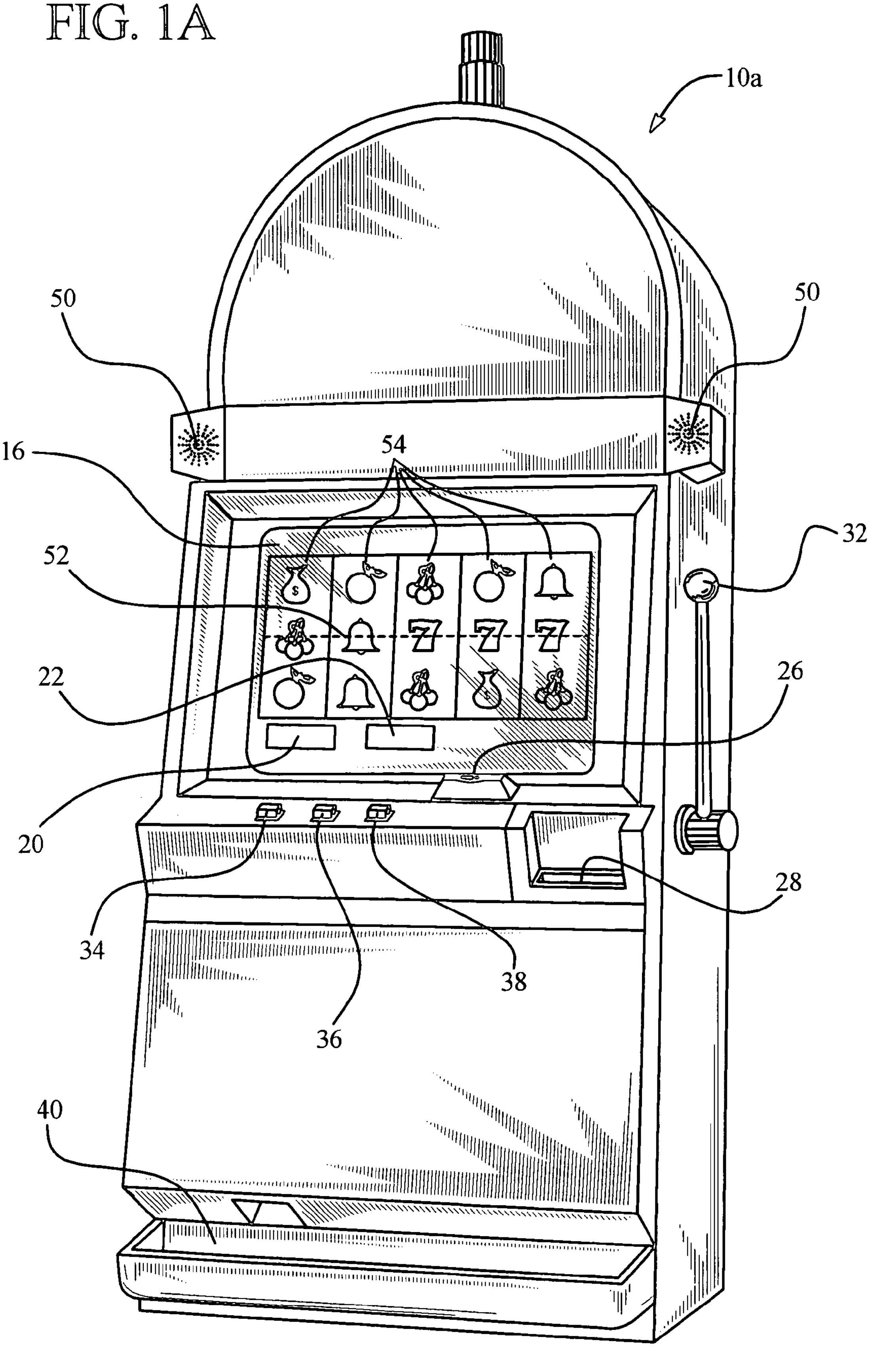
FIG. 1A is a front perspective view of one embodiment of the gaming device disclosed herein.
Figure 1B:
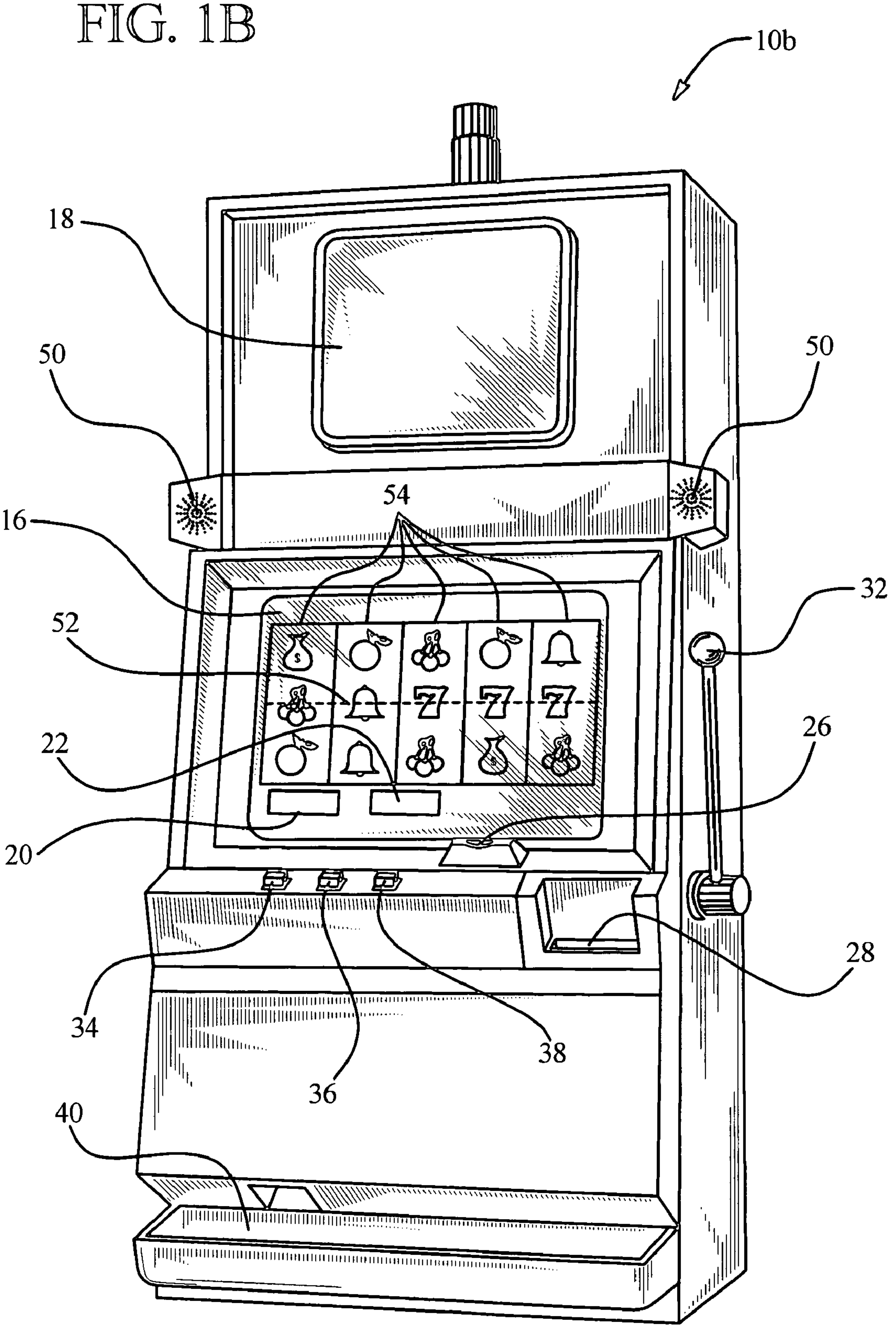
FIG. 1B is a front perspective view of another embodiment of the gaming device disclosed herein.

Referring now to the drawings, two alternative embodiments of the gaming device are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
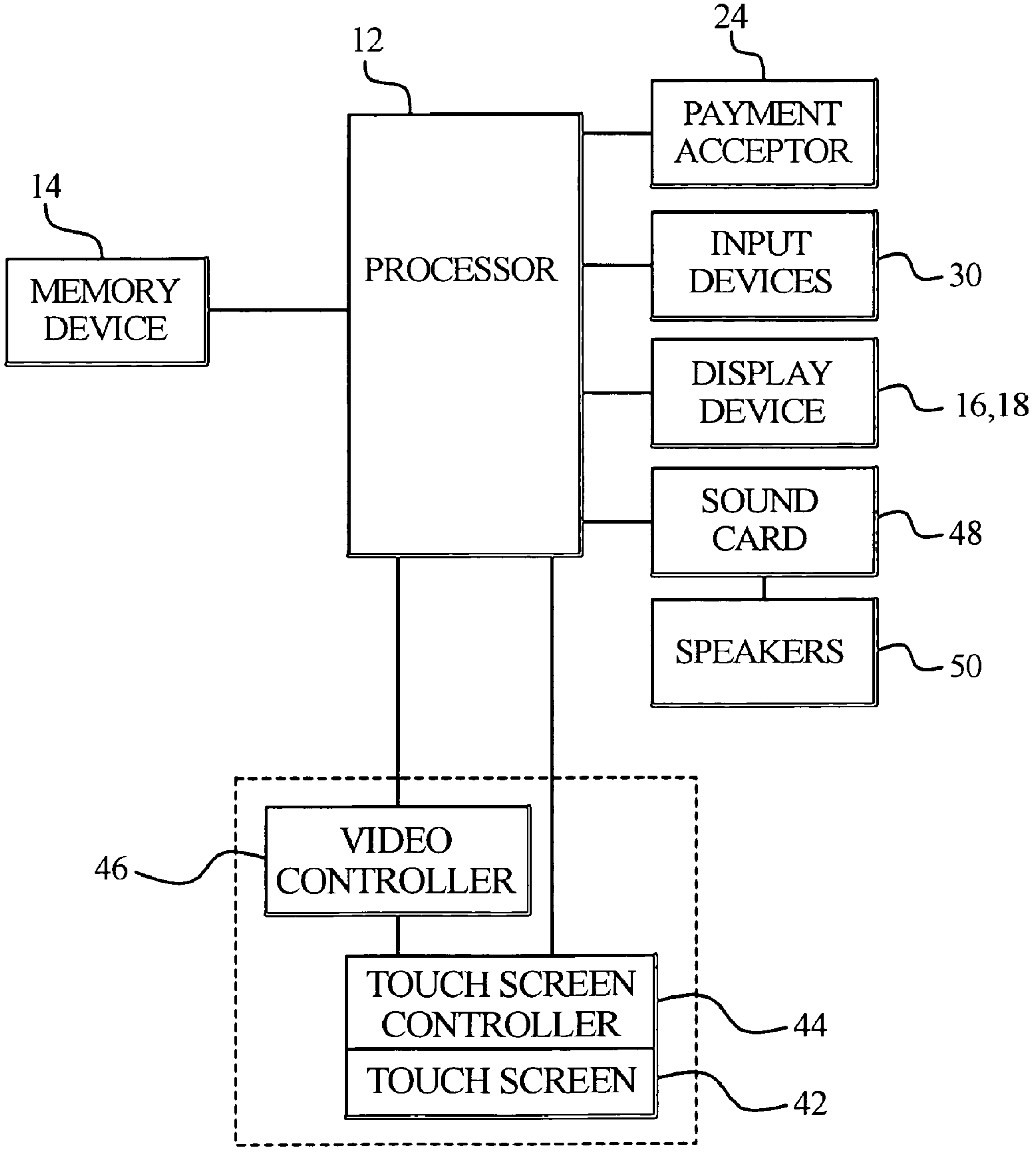
FIG. 2A is a schematic block diagram of one embodiment of an electronic configuration for one of the gaming devices disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the art. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome. Such random determination could be provided through utilization of a random number generator (RNG) or other suitable randomization process.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses.

In another embodiment, upon a player initiating game play at the gaming device, the gaming device enrolls in a bingo game. In this embodiment, a bingo server calls the bingo balls that result in a specific game outcome. The resultant game outcome is communicated to the individual gaming device to be provided to a player.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. In another embodiment, at least one display device may be a mobile display device, such as a PDA or tablet PC, that enables play of at least a portion of the primary or secondary game at a location remote from the gaming device. As seen in FIGS. 1A and 1B, in one embodiment, the gaming device includes a credit display 20 which displays a player's current number of credits, cash, account balance or the equivalent. In one embodiment, gaming device includes a bet display 22 which displays a player's amount wagered.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display including a projected and/or reflected image or any other suitable electronic device or display mechanism. In one embodiment, as described in more detail below, the display device includes a touch-screen with an associated touch-screen controller. The display devices may be of any suitable configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary or base game. The gaming machine or device may include some or all of the features of conventional gaming machines or devices. The primary or base game may comprise any suitable reel-type game, card game, number game or other game of chance susceptible to representation in an electronic or electromechanical form which produces a random outcome based on probability data upon activation from a wager. That is, different primary wagering games, such as video poker games, video blackjack games, video Keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. It should be appreciated that the gaming device may include any suitable number of paylines, such as fifty unique paylines wherein each payline starts in the left-most column or reel and ends in the right-most column or reel. In one embodiment, the gaming device displays at least one and preferably a plurality of reels 54, such as three to five reels 54 in either electromechanical form with mechanical rotating reels or video form with simulated reels and movement thereof. In one embodiment, an electromechanical slot machine includes a plurality of adjacent, rotatable wheels which may be combined and operably coupled with an electronic display of any suitable type. In another embodiment, if the reels 54 are in video form, one or more of the display devices, as described above, display the plurality of simulated video reels 54. Each reel 54 displays a plurality of indicia or symbols 60 such as bells, hearts, fruits, numbers, letters, bars or other images which preferably correspond to a theme associated with the gaming device. Accordingly, the plurality of reels form a symbol matrix with a plurality of paylines. In different embodiments, the gaming device awards prizes when the reels of the primary game stop spinning if specified types and/or configurations of indicia or symbols occur on an active payline or otherwise occur in a winning pattern, occur on the requisite number of adjacent reels and/or occur in a scatter pay arrangement.

In one embodiment, a base or primary game may be a poker game wherein the gaming device enables the player to play a conventional game of video poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one and preferable a plurality of the selectable indicia or numbers via an input device or via the touch screen. The gaming device then displays a series of drawn numbers to determine an amount of matches, if any, between the player's selected numbers and the gaming device's drawn numbers. The player is provided an award based on the amount of matches, if any, based on the amount of determined matches.

In one embodiment, in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game could be accomplished through a simple "buy in" by the player if, for example, the player has been unsuccessful at qualifying through other specified activities.

Figure 2B:
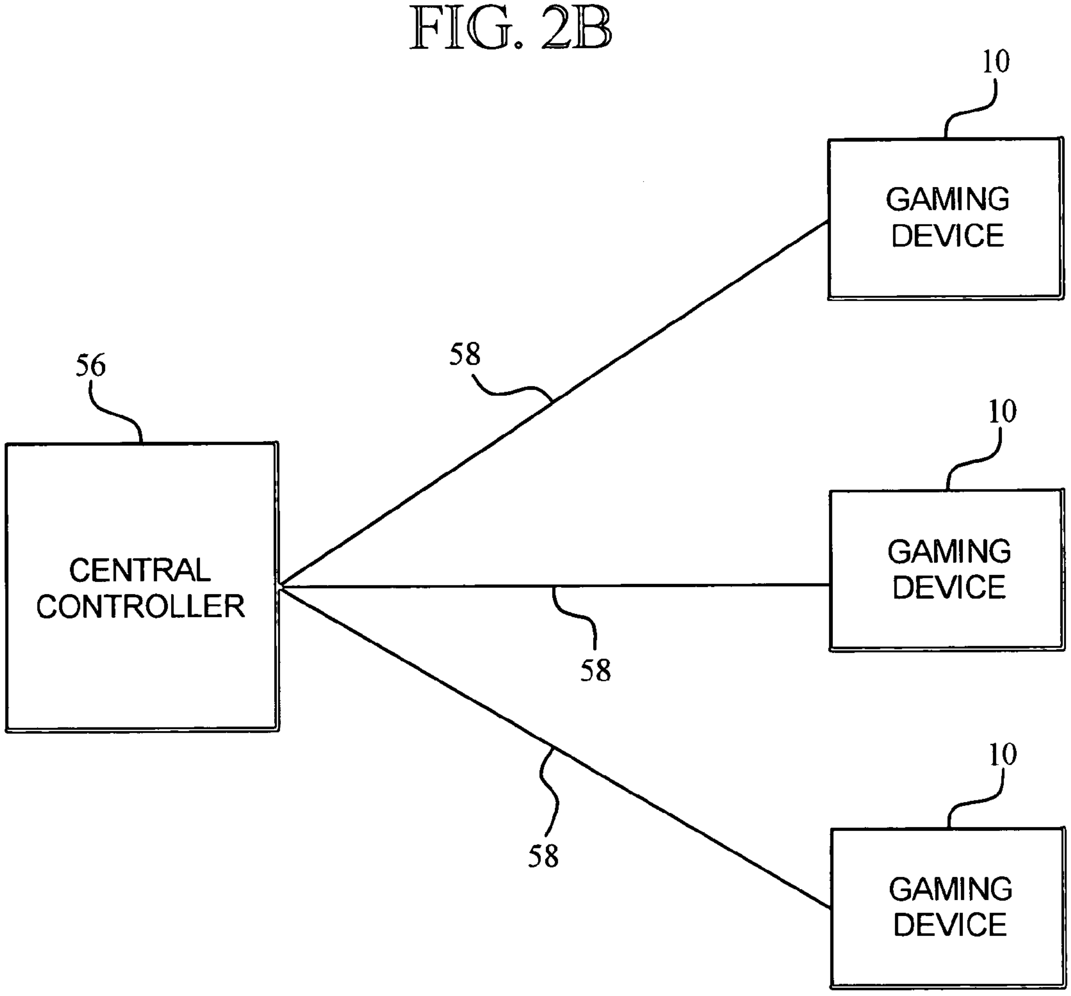
FIG. 2B is a schematic block diagram of one embodiment of a network configuration for a plurality of gaming devices disclosed herein.

In one embodiment, as illustrated in FIG. 2B, one or more of the gaming devices 10 may be connected to each other through a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo or keno game. In this embodiment, each individual gaming device utilizes one or more bingo or keno games to determine the predetermined game outcome value provided to the player for the interactive game played at that gaming device. In one embodiment, the bingo or keno game is displayed to the player. In another embodiment, the bingo or keno game is not displayed to the player, but the results of the bingo or keno game determine the predetermined game outcome value for the interactive game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a "daub" button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment insures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

In another embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a "chip" to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, in addition to the player winning one or more progressive awards which are associated with individual paylines, as described below, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer. In one embodiment, an individual gaming machine may trigger a progressive win, for example through a game play event such as a symbol-driven trigger. In one embodiment, the central server or other central controller determines when a progressive win is triggered. In one embodiment, a central controller and an individual gaming machine work in conjunction with each other to determine when a progressive win is triggered, for example through an individual gaming machine meeting a predetermined requirement established by the central controller.

Figure 3A:
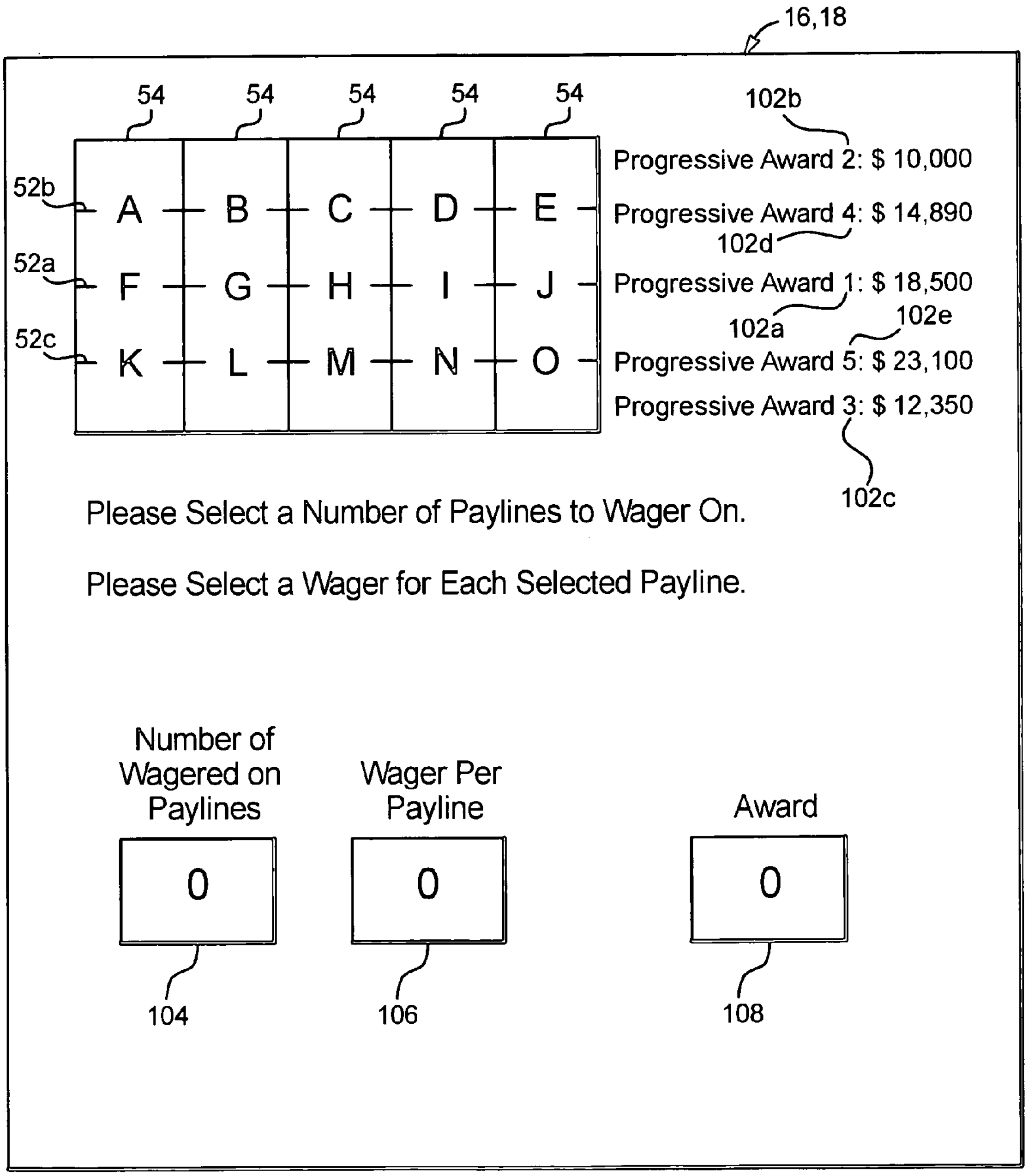

Referring now to FIG. 3A, in one embodiment, the plurality of reels 54 include 15 viewable symbol positions wherein each symbol position displays a symbol 60 (in this case, one of the first 15 letters of the alphabet, A through O). In this embodiment, the gaming device includes five paylines 52 wherein payline one 52*a* runs through the symbol positions which display symbols F, G, H, I, J; payline two 52*b* runs through the symbol positions which display symbols A, B, C, D, E; and payline three 52*c* runs through the symbol positions which display symbols K, L, M, N, O. Additionally, payline four (not shown) runs through the symbol positions which display symbols A, G, M, I, E; and payline five (not shown) runs through the symbol positions which display symbols K, G, C, I, O.

In this embodiment, each of the paylines is associated with an distinct progressive award. For example, as seen in FIG. 3A, payline one 52*a* is associated with a first progressive award 102*a* of $18,500 or 18,500 credits; payline two 52*b* is associated with a second progressive award 102*b* of $10,000 or 10,000 credits; payline three 52*c* is associated with a third progressive award 102*c* of $12,350 or 12,350 credits; payline four (not shown) is associated with a fourth progressive award 102*d* of $14,890 or 14,890 credits; and payline five (not shown) is associated with a fifth progressive award 102*e* of $23,100 or 23,100 credits. In this example, the gaming device displays each payline progressive award to the right of the last location of that payline, such that the first progressive award 102*a* is located to the right of the location with symbol J; the second progressive award 102*b* and the fourth progressive award 102*d* are located to the right of the location with symbol E; and the third progressive award 102*c* and the fifth progressive award 102*e* are located to the right of the location with symbol O. It should be appreciated that the gaming device may display such payline progressive information any suitable location in any suitable manner by any suitable display device.

In one embodiment, the gaming device enables the player to select one or more of the paylines and place a wager amount on each of the selected paylines. In one embodiment, the player must place the same wager amount on each selected payline. For example, the player may select all five paylines and place a wager of ten credits on each payline for a total wager of fifty credits. In another embodiment, the player may place different wager amounts on each selected payline. Appropriate messages such as "PLEASE SELECT A NUMBER OF PAYLINES TO WAGER ON" and "PLEASE SELECT A WAGER FOR EACH SELECTED PAYLINE" may be provided to the player visually, or through suitable audio or audiovisual displays.

After placing one or more wagers on one or more paylines, the gaming device allocates a percentage of each wager placed on an individual payline to the progressive award associated with that individual payline. For example, 10% of the ten credits wagered upon payline one 52*a* is allocated to the first progressive award 102*a* to increase the first progressive award 102*a* by one credit.

After wagering upon the paylines, the symbols are randomly rearranged and redisplayed on the reels and the gaming device determines if any winning symbol or winning symbol combination is rearranged and redisplayed on a wagered on payline. If any winning symbol or winning symbol combination is generated on a wagered on payline, the gaming device determines a payline award based on the generated winning symbol or winning symbol combination and the amount wagered on the payline which the winning symbol or winning symbol combination was generated on. The payline award is calculated by multiplying a base amount, as specified on an appropriate pay table or pay schedule, by the amount wagered on the payline.

Figure 3B:
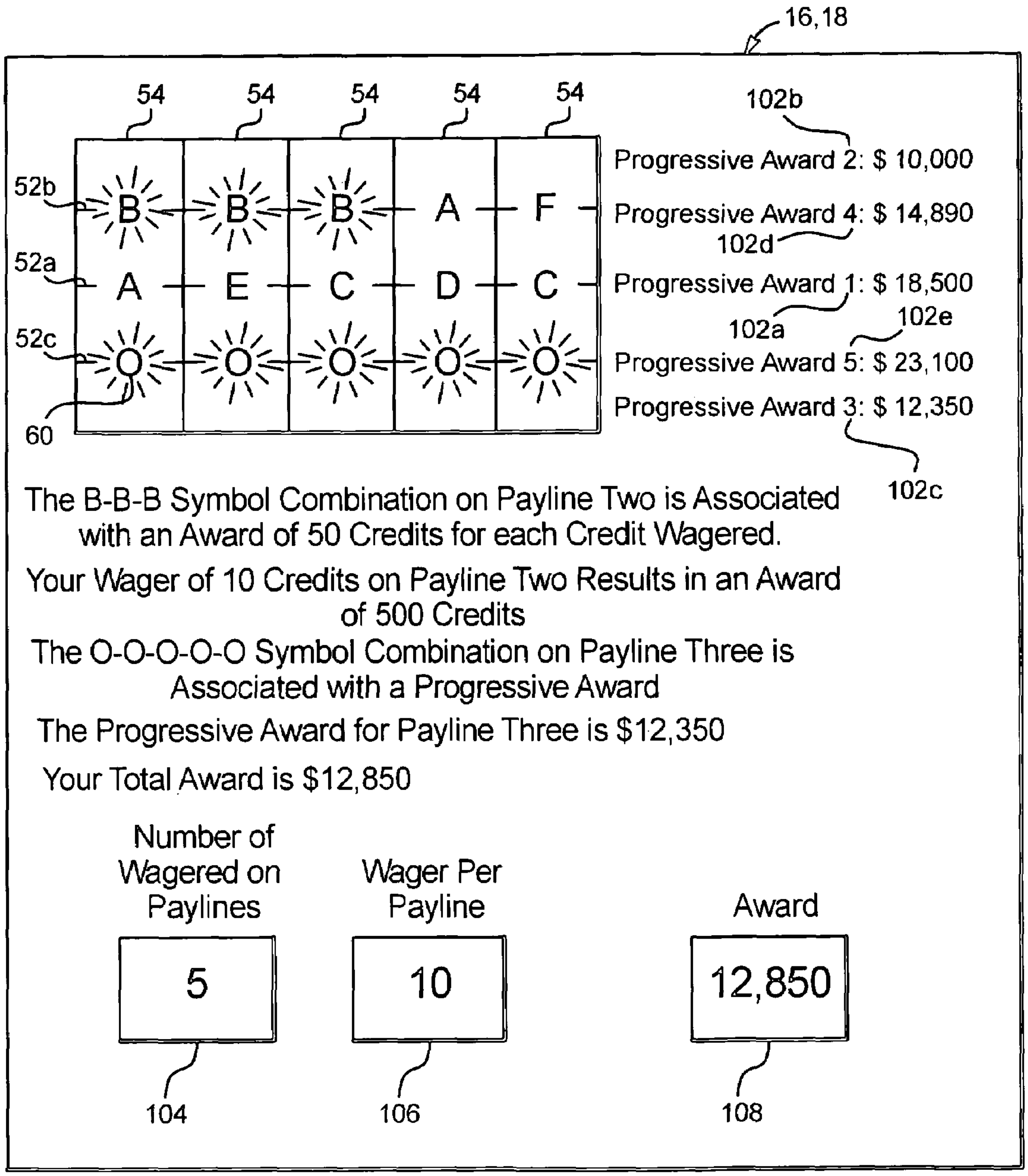

For example, as seen in FIG. 3B, after the player selected to place a wager of ten credits (as indicated in the wager per payline indicator 106) on each of five paylines (as indicated in the number of wagered on paylines indicator 104), the gaming device generated a plurality of symbols at the plurality of symbol positions. The gaming device determined that the "B-B-B" combination appearing on payline two 52*b* is a winning symbol combination. Accordingly, the gaming device determined the payline award for this winning symbol combination by multiplying a base amount of fifty credits associated with the winning "B-B-B" symbol combination by the ten credits payline wager placed on payline two for a total award of five-hundred credits. Appropriate messages such as "THE B-B-B SYMBOL COMBINATION IS ASSOCIATED WITH AN AWARD OF 50 CREDITS FOR EACH CREDIT WAGERED" and "YOUR WAGER OF 10 CREDITS ON PAYLINE TWO RESULTS IN AN AWARD OF 500 CREDITS" may be provided to the player visually, or through suitable audio or audiovisual displays.

Moreover, if a designated winning symbol or designated winning symbol combination which is associated with a progressive award triggering event is generated on a wagered on specific payline, the gaming device provides the player the payline progressive award associated with that specific wagered on payline. In this embodiment, the designated winning symbol or designated winning symbol combination is not associated with a specific progressive award, but rather is associated with a progressive award triggering event (which causes the progressive award associated with an individual payline to be provided to the player). That is, the award provided for a designated winning symbol or designated winning symbol combination is dependent on which payline the designated winning symbol or designated winning symbol combination was generated on and the current amount of the payline progressive award associated with that payline. For example, if a designated winning symbol combination is generated on a first payline (associated with a first progressive award of $18,500), the gaming device provides the player the first progressive award of $18,500, however, if the same designated winning symbol combination is generated on a second payline (associated with a second progressive award of $10,000), the gaming device provides the player the lower second progressive award of $10,000. Accordingly, in this embodiment, the same winning symbol or winning symbol combination may result in different awards based on which payline the winning symbol or winning symbol combination was generated on.

As further seen in FIG. 3B, the gaming device determined that the "O-O-O-O-O" combination appearing on payline three 52*c* is a designated winning symbol combination associated with a progressive award triggering event. Accordingly, the gaming device determines the payline progressive award for payline three to be the third payline progressive award of $12,350 and provides the player the third payline progressive award. Accordingly, the player's total award is twelve-thousand-eight-hundred-fifty credits (as indicated in the award indicator 108). Appropriate messages such as "THE O-O-O-O-O SYMBOL COMBINATION IS ASSOCIATED WITH A PROGRESSIVE AWARD", "THE PROGRESSIVE AWARD FOR THE PAYLINE THREE WHICH THE O-O-O-O-O SYMBOL COMBINATION WAS GENERATED ON IS $12,350" and "YOUR TOTAL AWARD IS $12,850" may be provided to the player visually, or through suitable audio or audiovisual displays.

As described above, after a progressive award is triggered and provided to a player, that progressive award is reset to an appropriate reset value. For example, after the gaming device provides the third progressive award to the player, the gaming device resets the third progressive award to a suitable reset value, such as 5,000 credits. In different embodiments, after a progressive award is provided to a player, the value which the progressive award resets to is predetermined, randomly determined, determined based on the player's wager, determined based on the status of one or more players (such as determined through a player tracking system), determined based on time, or determined based on any other suitable method.

In one embodiment, the player may win a plurality of distinct progressive awards based on a plurality of symbol combinations generated on the reels. For example, if a first designated winning symbol combination (which is associated with a progressive award triggering event) is generated on a first payline, the gaming device provides the player the first progressive award associated with the first payline. Moreover, if a second designated winning symbol combination (which is also associated with a progressive award triggering event) is generated on a second payline, the gaming device provides the player the second progressive award associated with the second payline.

In another embodiment, the player may win a plurality of distinct progressive awards based on one symbol combination generated on multiple paylines on the plurality of reels. For example, if a designated four symbol winning combination (which is associated with a progressive award triggering event) is generated on a first payline (which includes four symbol positions), the gaming device provides the player the progressive award associated with the first payline. Moreover, if a designated five symbol winning combination which is also associated with a progressive award triggering event is generated on a second payline (which includes the four symbol positions from the first payline and a fifth symbol position), the gaming device provides the player the progressive award associated with the second payline.

In one embodiment, a maximum amount must be wagered upon a designated payline to qualify the player to win the payline progressive award associated with that designed payline. In this embodiment, the player may place maximum wager amounts on some, but not all of the paylines and still qualify to win the payline progressive amount associated with each payline with they placed the maximum wager amount. For example, a player may wager the maximum amount on three of the five available paylines and thus qualify to win the payline progressive awards associated with the three maximum wagered paylines. In another embodiment, the player must wager the maximum amount on a plurality of paylines to qualify to win the payline progressive award for each of the paylines. In another embodiment, the player must wager the maximum amount on at least one payline to qualify to win the payline progressive award for each of the paylines.

In another embodiment, a wager amount which is less than the maximum amount and greater than a designed minimum amount must be wagered on a designated payline to qualify the player to win the payline progressive award associated with that designed payline. For example, at least 50% of the maximum wager must be placed on a designated payline to qualify the player to win the payline progressive award associated with that designated payline. In another embodiment, different paylines have different wager requirements which must be satisfied for the player to win the payline progressive award associated with that payline. For example, the ninth payline which is associated with the highest valued progressive award requires the player to wager the maximum amount to quality to win the payline progressive award associated with the ninth payline. In this example, the eighth payline which is associated with the second highest valued progressive award requires the player to wager the second highest amount (but less than the maximum wager amount) to quality to win the payline progressive award associated with the eighth payline. On the other hand, in this example, the first payline which is associated with the lowest valued progressive award requires the player to wager the lowest amount to quality to win the payline progressive award associated with the first payline and the second payline which is associated with the second lowest valued progressive award requires the player to wager the second lowest amount (i.e., more than the wager amount associated with the first payline) to quality to win the payline progressive award associated with the second payline.

In another embodiment, the player is not required to wager the maximum amount on a designated payline to qualify to win the payline progressive award associated with that designated payline. In another embodiment, different paylines have different wager requirements which must be satisfied for the player to qualify to win the payline progressive award for that payline. For example, a first payline requires the maximum amount to be wagered upon the first payline to qualify the player to win the payline progressive award associated with the first payline, a second payline requires at least 50% of the maximum wager to be placed on the second payline to qualify the player to win the payline progressive award associated with the second payline and a third payline does not require any preset wager amount to be placed on the third payline to qualify the player to win the payline progressive award associated with the third payline.

In one embodiment, a plurality of or each of the progressive awards start at the same level and increment or increase (based on wagers placed on paylines associated with the progressive awards) until provided to a player. In another embodiment, the progressive awards start at different levels such as $10, $100, $1000 and $10,000 and increment or increase until provided to a player. In one embodiment, the gaming device is designated such that one, more or each of the progressive awards have a relatively low value but a relatively high frequency of being provided to a player. In another embodiment, the gaming device is designated such that one, more or each of the progressive awards have a relatively high value but a relatively low frequency of being provided to a player.

In one embodiment, the percentage of a player's wager on an individual payline that goes to fund the payline progressive award associated with that individual payline is equal for each payline. In another embodiment, the percentage of a player's wager on an individual payline that goes to fund the payline progressive award associated with that individual payline are different for a plurality of paylines. In another embodiment, the percentage of a player's wager on an individual payline that goes to fund the payline progressive award associated with that individual payline are different for each payline. In different embodiments, the percentage of each wager placed on a designated payline which is allocated to fund the progressive award associated with that designated payline is predetermined, randomly determined, determined based on the player's wager, determined based on the status of one or more players (such as determined through a player tracking system), determined based on time, or determined based on any other suitable method.

In one embodiment, a plurality of the progressive awards are independent from each other. In another embodiment, each of the progressive awards are independent from one another. In another embodiment, one or more of the progressive awards are based on or otherwise dependent on at least another one of the progressive awards. In one such embodiment, the player's total wager placed is allocated, at least in part, to fund one progressive award. In this embodiment, each of the paylines is associated with a distinct progressive award which is derived from a portion or percentage of this one funded progressive award. In another embodiment, a percentage of the player's total wager placed is allocated, at least in part, to fund a plurality of distinct progressive awards associated with a plurality of the paylines. In another embodiment, a percentage of the player's total wager placed is allocated, at least in part, to fund each distinct progressive awards associated with each of the paylines. In these embodiments, each distinct progressive award (which is associated with a distinct triggering event or symbol combination generated on a specific payline) is funded by a percentage of the player's total wager placed at the gaming device.

In one embodiment, the progressive awards which are funded by the player's total wager are independent of which paylines the player wagers on. In another embodiment, the progressive awards which are funded by the player's total wager are based, at least in part, of which paylines the player wagers on. In different embodiments, the percentage of the total wager which is allocated, at least in part, to fund a plurality or each of the progressive awards associated with a plurality or each of the paylines is predetermined, randomly determined, determined based on the player's wager, determined based on the status of one or more players (such as determined through a player tracking system), determined based on time, or determined based on any other suitable method.

In another embodiment, any number of the available paylines may be associated with distinct progressive awards. For example, only ten out of twenty available paylines may each be associated with an distinct payline progressive awards. In different embodiments, the number of paylines associated with distinct progressive awards is predetermined, randomly determined, determined based on the player's wager, determined based on the status of one or more players (such as determined through a player tracking system), determined based on time, or determined based on any other suitable method. In different embodiments, which paylines are associated with individual progressive awards is predetermined, randomly determined, determined based on the player's wager, determined based on the status of one or more players (such as determined through a player tracking system), determined based on time, or determined based on any other suitable method.

In another embodiment, any number of paylines may be grouped to offer the same progressive award. For example, paylines one to five share a first payline progressive award and paylines six to ten share a different, second payline progressive award. In different embodiments, which paylines are grouped together to share which progressive award is predetermined, randomly determined, determined based on the player's wager, determined based on the status of one or more players (such as determined through a player tracking system), determined based on time, or determined based on any other suitable method.

In another embodiment, a plurality of progressive awards are each associated with the same payline. For example, each payline is associated with four different progressive awards. In one embodiment, which of a plurality of progressive awards associated with the same payline that is provided to the player is based on the number of symbols in the combination which triggered the progressive award. For example, if the symbol combination which triggered the progressive award includes three symbols on a first payline, the player is provided one of the plurality of progressive awards associated with the first payline. On the other hand, if the symbol combination which triggered the progressive award includes four symbols on the first payline, the player is provided a different one of the progressive awards associated with the first payline. It should be appreciated that this embodiment provides increased excitement for the players by increasing the frequency of progressive award triggering events.

In different embodiments, which progressive awards are associated with which paylines is predetermined, randomly determined, determined based on the player's wager, determined based on the status of one or more players (such as determined through a player tracking system), determined based on time, or determined based on any other suitable method. In one such embodiment, any number of payline progressive awards may be associated with the same payline. In different embodiments, the number of progressive awards associated with the same payline is predetermined, randomly determined, determined based on the player's wager, determined based on the status of one or more players (such as determined through a player tracking system), determined based on time, or determined based on any other suitable method.

In one embodiment, one or more of the progressive awards are funded, at least partially, via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed. In this embodiment, a separate wager or side-bet must be placed to qualify the player to win payline progressive awards. For example, a separate ten credit wager must be placed on each payline to qualify the player to win that payline progressive award. In these embodiments, as part or all of the side-bets are allocated to fund the progressive awards, the values of the progressive awards dynamically increase based on the player placing one or more side-bets. In different embodiments, the required side wager amount for each payline is predetermined, randomly determined, determined based on the player's wager, determined based on the player's status (such as determined through a player tracking system), determined based on time or determined based on any other suitable method.

In another embodiment, any symbol or combination of symbols may be associated with a payline progressive award triggering event. For example, a three symbol combination, such as "B-B-B," may be associated with the player winning the payline progressive award associated with the payline. which the B-B-B symbol combination was generated on. In different embodiments, the determination of which symbols or symbol combination will trigger the gaming device to provide a payline progressive award to a player is predetermined, randomly determined, determined based on the player's wager, determined based on the player's status (such as determined through a player tracking system), determined based on time or determined based on any other suitable method.

In another embodiment, the gaming device includes one or more wild symbols. Each wild symbol functions to substitute for a plurality of the other generated symbols to result in a winning combination of symbols. In this embodiment, if a wild symbol is generated at a symbol position which a plurality of paylines cross-over or otherwise intersect at, the wild symbol may cause a plurality of symbol combinations on the plurality of intersecting paylines to each become a winning symbol combinations. In one such embodiment, if a plurality of symbol combinations are modified (via the generation of one or more wild symbols at one or more symbol positions) to a plurality of symbol combinations that are each associated with a progressive award triggering event, the player will win an individual payline progressive award for each of such modified symbol combinations.

In another embodiment, a designated symbol or symbol combination generated on multiple paylines causes the gaming device to provide a payline progressive award for all of the paylines which the designated symbol or symbol combination was generated on. For example, a "B-B-B" symbol combination generated on payline one and payline thirty (if the B-B-B symbol combination is associated with providing a payline progressive award to a player) will cause the gaming device to provide the player the payline progressive award associated with payline one as well as provide the player the payline progressive associated with payline thirty. In another embodiment, a designated symbol or symbol combination generated on multiple paylines cause the gaming device to provide a payline progressive award for some of these paylines (which the designated symbol or symbol combination was generated on). For example, a "B-B-B" generated on payline one and payline thirty (if the B-B-B symbol combination is associated with providing a payline progressive award to a player) will cause the gaming device to provide the player with the highest payline progressive award or, in the case of equal awards, only one of the two progressive awards.

In another embodiment, any suitable event may trigger the gaming device to provide a payline progressive award. In different embodiments, one or more payline progressive awards may be triggered based on the player's total wager, the player's wager on one or more individual paylines, the player's type of wager, the player's wins, the frequency of the player's wins and/or losses or the frequency which the player places wagers. Moreover, the gaming device may trigger the gaming device to provide a payline progressive award at a random frequency that increases with larger or more frequent wagers. In different embodiments, the triggering of the gaming device to provide a payline progressive award is predetermined, randomly determined, determined based on the player's wager, determined based on the player's status (such as determined through a player tracking system), determined based on time or determined based on any other suitable method.

In another embodiment, a proportion of the actual wager to the maximum wager determines the proportion of the payline progressive award to be provided to the player (if a designed symbol combination is generated on that payline). For example, a wager of 50% of the maximum wager pays 50% of the payline progressive award.

In another embodiment, the payline progressive award is paid over the course of multiple years. For example, a payline progressive award is paid out over twenty years. In different embodiments, the amount of time a payline progressive award is paid out over of is predetermined, randomly determined, determined based on the player's wager, determined based on the player's status (such as determined through a player tracking system), determined based on time or determined based on any other suitable method.

In another embodiment, the payline progressive awards may be provided as any type of award. For example, payline progressive awards may be provided as credits, free spins, bonus features and/or any non-currency award, such as prizes (e.g., a new car) or services. In different embodiments, the type of award provided for a payline progressive award is predetermined, randomly determined, determined based on the player's wager, determined based on the player's status (such as determined through a player tracking system), determined based on time or determined based on any other suitable method.

In another embodiment, payline progressive awards for each machine are funded by the wagers placed on two or more machines. For example, all wagers placed on games in a casino contribute towards a common set of payline progressive awards. In one embodiment, a plurality of gaming devices at one or more gaming sites are networked to the central server in a progressive configuration, wherein a portion of each wager placed is allocated to one or more payline progressive awards. In one embodiment, the payline progressive awards are associated with the system gaming machines which each contribute portions of the progressive awards. In one such embodiment, different payline progressive awards are associated with different numbers of gaming devices. For example, a payline progressive award valued at $10,000 may be associated with ten gaming devices while another payline progressive award valued at $500,000 may be associated with one-hundred gaming devices. In one embodiment, the multiple gaming machines may be in the same bank of machines, in the same casino or gaming establishment such as through LAN or in two or more different casinos or gaming establishments such as through a WAN. In another embodiment, each individual gaming machine maintains one or more payline progressive awards wherein a portion of each wager placed on a specific payline at that respective gaming machine is allocated to that specific payline progressive award maintained by such individual gaming machine. For example, a well-played gaming device may be associated with higher payline progressive awards than a lesser-played gaming device. In another embodiment, each individual gaming machine maintains one or more payline progressive awards and the central server simultaneously or substantially simultaneously maintains one or more payline progressive awards.

In another embodiment, the payline progressive award feature operates as a secondary bonus game on any primary game. For example, the payline progressive award feature operates as a second-screen, free spin bonus feature on a primary, traditional, video slot machine.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming device operable under control of a processor, said gaming device comprising:

a game controlled by the processor;

a plurality of symbols in the game, wherein said symbols form at least one designated symbol combination and at least one non-designated winning symbol combination;

a plurality of symbol positions in the game;

a plurality of progressive pools associated with the game, each progressive pool having an award value greater than zero;

a plurality of paylines in the game, wherein each payline is individually associated with at least a separate one of said progressive pools; and a display device operable to display said game;

wherein said processor is programmed to operate with the display device to control a play of the game by:

(a) enabling a player to participate in the game by placing at least one of a plurality of different payline wager amounts on each of one or more of the paylines, wherein:

(i) each payline wager amount is greater than zero, and (ii) for each wagered on payline, the progressive pool associated with said payline is:

(A) separate from which of the payline wager amounts was placed on said payline, and (B) independent of any incrementation of the award value of said associated progressive pool caused by said placed payline wager amount;

(b) generating a plurality of the symbols at the symbol positions;

(c) determining if the designated symbol combination was generated on one of said paylines;

(d) if the designated symbol combination was generated on one of said paylines, providing the player the award value of the progressive pool individually associated with the payline which the designated symbol combination was generated on;

(e) determining if the at least one non-designated winning symbol combination was generated on one of said paylines; and (f) if the at least one non-designated winning symbol combination was generated on one of said paylines, providing the player an award value associated with the generated non-designated winning symbol combination.

2. The gaming device of claim 1, wherein at least one of said paylines is individually associated with a plurality of said progressive pools.

3. The gaming device of claim 1, wherein a plurality of said paylines are each individually associated with a plurality of said progressive pools.

4. The gaming device of claim 1, wherein the processor is programmed to operate to control the play of the game by resetting the provided award value of the progressive pool to a reset award value.

5. The gaming device of claim 1, wherein each progressive pool is funded, at least in part, by the at least one payline wager amount placed on the payline associated with said progressive pool.

6. The gaming device of claim 1, wherein the processor is programmed to operate to control the play of the game by providing the player the award value of the progressive pool individually associated with the payline which the designated symbol combination was generated on, if the designated symbol combination was generated on one of said paylines individually associated with at least one of said progressive pools and a maximum wager was placed on said payline.

7. The gaming device of claim 1, wherein at least two of the progressive pools are independent of one another.

8. A gaming device operable under control of a processor, said gaming device comprising:

a plurality of symbols generated at a plurality of symbol positions upon at least one of a plurality of different wager amounts placed on at least one of a plurality of paylines, wherein each wager amount is greater than zero;

a first progressive pool associated with a first of said paylines, said first progressive pool having an award value greater than zero, wherein said first progressive pool is provided to a player if a designated symbol combination is generated on said first payline and the player placed a wager on said first payline, wherein for said wagered on first payline, the first progressive pool is: (i) separate from which of the payline wager amounts was placed on said first payline, and (ii) independent of any incrementation of the award value of the first progressive pool caused by the wager placed on said first payline;

a distinct second progressive pool associated with a second of said paylines, said second progressive pool having an award value greater than zero, wherein said second progressive pool is provided to the player if the designated symbol combination is generated on said second payline and the player placed a wager on said second payline, wherein for said wagered on second payline, the second progressive pool is: (i) separate from which of the payline wager amounts was placed on said second payline, and (ii) independent of any incrementation of the award value of the second progressive pool caused by the wager placed on said second payline;

an award value associated with a non-designated winning symbol combination generated on one of said paylines, wherein said award value associated with the non-designated winning symbol combination is provided to the player if the non-designated winning symbol combination is generated on one of said paylines; and a display device operable with said processor to display said symbols, said first progressive pool and said second progressive pool.

9. The gaming device of claim 8, wherein the first progressive pool is independent of the second progressive pool.

10. A method of operating a gaming device, said method comprising:

(a) enabling a player to participate in a game by placing at least one of a plurality of different payline wager amounts on each of a plurality of paylines, each payline wager amount having a value greater than zero, wherein each paylines is individually associated with at least a separate one of a plurality of progressive pools, each progressive pool has an award value greater than zero, and for each wagered on payline, the progressive pool associated with said payline is:

(i) separate from which of the payline wager amounts was placed on said payline, and (ii) independent of any incrementation of the award value of said associated progressive pool caused by said placed payline wager amount;

(b) generating a plurality of symbols at a plurality of symbol positions;

(c) causing a display device to display the plurality of generated symbols at the plurality of symbol positions;

(d) determining if a designated symbol combination was generated on one of said paylines;

(e) if the designated symbol combination was generated on one of said paylines, providing the player the award value of the progressive pool individually associated with the payline which the designated symbol combination was generated on;

(f) determining if a non-designated winning symbol combination was generated on one of said paylines; and (g) if the non-designated winning symbol combination was generated on one of said paylines, providing the player an award value associated with the generated non-designated winning symbol combination.

11. The method of claim 10, wherein at least one of said paylines is individually associated with a plurality of said progressive pools.

12. The method of claim 10, wherein a plurality of said paylines are each individually associated with a plurality of said progressive pools.

13. The method of claim 10, which includes resetting the provided award value of the progressive pool to a reset award value.

14. The method of claim 10, wherein each progressive pool is funded, at least in part, by the at least one payline wager amount placed on the payline associated with said progressive pool.

15. The method of claim 10, which includes providing the player the award value of the progressive pool individually associated with the payline which the designated symbol combination was generated on, if the designated symbol combination was generated on one of said paylines individually associated with at least one of said progressive pools and a maximum wager was placed on said payline.

16. The method of claim 10, wherein at least of the progressive pools are independent of one another.

17. The method of claim 10, which is provided through a data network.

18. The method of claim 17, wherein the data network is an internet.

19. A method of operating a gaming device, said method comprising:

(a) enabling a player to place at least one of a plurality of different payline wager amounts on each of a plurality of paylines, wherein each payline wager amount is greater than zero;

(b) generating a plurality of symbols at a plurality of symbol positions;

(c) causing a display device to display the plurality of generated symbols at the plurality of symbol positions;

(d) if a designated symbol combination is generated on a first of said paylines and the player placed a wager on said first payline, providing to the player an award value of a first progressive pool associated with the first of said paylines, wherein said award value of the first progressive pool is greater than zero and for said first wagered on payline, the first progressive pool is: (i) separate from which of the payline wager amounts was placed on said first payline and (ii) independent of any incrementation of the award value of the first progressive pool caused by the wager placed on said first payline;

(e) if the designated symbol combination is generated on a second of said paylines and the player placed a wager on said second payline, providing to the player an award value of a distinct second progressive pool associated with the second of said paylines, wherein said award value of the second progressive pool is greater than zero and for said second wagered on payline, the second progressive pool is: (i) separate from which of the payline wager amounts was placed on said second payline and (ii) independent of any incrementation of the award value of the second progressive pool caused by the wager placed on said second payline; and (f) if a non-designated winning symbol combination is generated on one of said paylines, providing the player an award value associated with the generated non-designated winning symbol combination.

20. The method of claim 19, wherein the first progressive pool is independent of the second progressive pool.

21. The method of claim 19, which is provided through a data network.

22. The method of claim 21, wherein the data network is an internet.

23. A memory device which includes a plurality of instructions, that when executed by at least one processor, cause a gaming machine to:

(a) enable a player to participate in a game by placing at least one of a plurality of different payline wager amounts on each of a plurality of paylines, wherein each payline wager amount is greater than zero and each paylines is individually associated with at least a separate one of a plurality of progressive pools, each progressive pool has an award value greater than zero, and for each wagered on payline, the progressive pool associated with said payline is: (i) separate from which of the payline wager amounts was placed on said payline, and (ii) independent of any incrementation of the award value of said associated progressive pool caused by said placed payline wager amount;

(b) generate a plurality of symbols at a plurality of symbol positions;

(c) determine if a designated symbol combination was generated on one of said paylines;

(d) if the designated symbol combination was generated on one of said paylines, provide the player the award value of the progressive pool individually associated with the payline which the designated symbol combination was generated on;

(e) determine if a non-designated winning symbol combination was generated on one of said paylines; and (f) if the non-designated winning symbol combination was generated on one of said paylines, provide the player an award value associated with the generated non-designated winning symbol combination.

24. The memory device of claim 23, wherein the plurality of instructions, when executed by the at least one processor, cause the gaming machine to individually associate at least one of said paylines with a plurality of said progressive pools.

25. The memory device of claim 23, wherein the plurality of instructions, when executed by the at least one processor, cause the gaming machine to individually associate each of a plurality of said paylines with a plurality of said progressive pools.

26. The memory device of claim 23, wherein the plurality of instructions, when executed by the at least one processor, cause the gaming machine to reset the provided award value of the progressive pool to a reset award value.

27. The memory device of claim 23, wherein the plurality of instructions, when executed by the at least one processor, cause the gaming machine to fund each progressive pool, at least in part, by the at least one payline wager amount placed on the payline associated with said progressive pool.

28. The memory device of claim 23, wherein the plurality of instructions, when executed by the at least one processor, cause the gaming machine to provide the player the award value of the progressive pool individually associated with the payline which the designated symbol combination was generated on, if the designated symbol combination was generated on one of said paylines individually associated with at least one of said progressive pools and a maximum wager was placed on said payline.

29. The memory device of claim 23, which is selected from the group consisting of a detachable cartridge, a disk, a random access memory, non-volatile random access memory, magnet random access memory, ferroelectric random access memory, a read only memory, flash memory, electrically erasable programmable read only memory, optical memory, semiconductor memory and an application-specific integrated circuit.

30. A gaming system comprising:

a controller, said controller programmed to maintain a plurality of progressive pools; and at least one gaming device including:

a display device; and a gaming device processor programmed to operate with said central controller and said display device to:

(a) enable a player to participate in a game by placing at least one of a plurality of different payline wager amounts on each of a plurality of paylines, wherein each payline wager amount is greater than zero and each paylines is individually associated with at least a separate one of the plurality of progressive pools, each progressive pool has an award value greater than zero, and for each wagered on payline, the progressive pool associated with said payline is: (i) separate from which of the payline wager amounts was placed on said payline, and (ii) independent of any incrementation of the award value of said associated progressive pool caused by said placed payline wager amount;

(b) generate a plurality of symbols at a plurality of symbol positions;

(c) determine if a designated symbol combination was generated on one of said paylines;

(d) if the designated symbol combination was generated on one of said paylines, provide the player the award value of the progressive award individually associated with the payline which the designated symbol combination was generated on;

(e) determine if a non-designated winning symbol combination was generated on one of said paylines; and (f) if the non-designated winning symbol combination was generated on one of said paylines, provide the player an award value associated with the generated non-designated winning symbol combination.

31. The gaming system of claim 30, which includes a plurality of gaming devices.

32. A method of operating a gaming system, said gaming system including a controller in communication with at least one gaming device, said method comprising:

(a) causing the controller to maintain a plurality of progressive pools;

(b) causing a first one of the gaming devices to:

(i) enable a player to participate in a game at the first one of the gaming devices by placing at least one of a plurality of different payline wager amounts on each of a plurality of paylines, wherein each payline wager amount is greater than zero and each paylines is individually associated with at least a separate one of said plurality of progressive pools, each progressive pools has an award value greater than zero, and for each wagered on payline, the progressive pool associated with said payline is: (i) separate from which of the payline wager amounts was placed on said payline, and (ii) independent of any incrementation of the award value of said associated progressive pool caused by said placed payline wager amount, (ii) generate a plurality of symbols at a plurality of symbol positions, (iii) cause a display device to display the plurality of generated symbols at the plurality of symbol positions, (iv) determine if a designated symbol combination was generated on one of said paylines, and (v) determine if a non-designated winning symbol combination was generated on one of said paylines;

(c) if the designated symbol combination was generated on one of said paylines, causing the controller to provide the player the award value of the progressive pool individually associated with the payline which the designated symbol combination was generated on; and (d) if the non-designated winning symbol combination was generated on one of said paylines, causing the controller to provide the player an award value associated with the generated non-designated winning symbol combination.

33. The method of claim 32, which is provided through a data network.

34. The method of claim 33, wherein the data network is an internet.

* * * * *

UNITED STATES PATENT AND TRADEMARK OFFICE

CERTIFICATE OF CORRECTION

PATENT NO. : 7,578,740 B2
APPLICATION NO. : 11/325873
DATED : August 25, 2009
INVENTOR(S) : Marks et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 785 days.

Signed and Sealed this

Seventh Day of September, 2010

David J. Kappos

*Director of the United States Patent and Trademark Office*